(12) United States Patent
Ozawa

(10) Patent No.: US 7,882,376 B2
(45) Date of Patent: Feb. 1, 2011

(54) POWER CONTROL FOR A CORE CIRCUIT AREA OF A SEMICONDUCTOR INTEGRATED CIRCUIT DEVICE

(75) Inventor: Kazumasa Ozawa, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 659 days.

(21) Appl. No.: 11/782,006

(22) Filed: Jul. 24, 2007

(65) Prior Publication Data

US 2008/0086650 A1 Apr. 10, 2008

(30) Foreign Application Priority Data

Oct. 6, 2006 (JP) ............................. 2006-275563

(51) Int. Cl.
G06F 1/00 (2006.01)
G06F 1/26 (2006.01)
G06F 1/32 (2006.01)
B23K 11/24 (2006.01)

(52) U.S. Cl. ..................... 713/310; 713/300; 713/324; 323/318

(58) Field of Classification Search ................ 713/300, 713/310, 324; 323/318
See application file for complete search history.

(56) References Cited

U.S. PATENT DOCUMENTS

| 5,812,860 | A | * | 9/1998 | Horden et al. ............... 713/322 |
| 6,366,957 | B1 | * | 4/2002 | Na ............................. 709/229 |
| 6,715,090 | B1 | * | 3/2004 | Totsuka et al. .............. 713/323 |
| 6,792,551 | B2 | * | 9/2004 | Dai ............................. 713/320 |
| 6,920,574 | B2 | * | 7/2005 | Youngs ....................... 713/324 |
| 7,096,386 | B2 | * | 8/2006 | Ozawa ......................... 714/30 |
| 7,142,009 | B1 | * | 11/2006 | Watt et al. ..................... 326/38 |
| 2005/0010748 | A1 | * | 1/2005 | Osborn ......................... 713/1 |
| 2006/0288245 | A1 | * | 12/2006 | Lee ............................. 713/320 |
| 2008/0028244 | A1 | * | 1/2008 | Capps et al. ................. 713/324 |

FOREIGN PATENT DOCUMENTS

| JP | 05-259879 | 10/1993 |
| JP | 2003-332901 | 11/2003 |

* cited by examiner

Primary Examiner—Ji H Bae
(74) Attorney, Agent, or Firm—Volentine & Whitt, PLLC

(57) ABSTRACT

The present invention provides an LSI which comprises first circuit areas (e.g., an I/O area and a VBAT area) in which power is always held ON, a second circuit area (e.g., a CORE area) capable of ON/OFF-switching of the power, a power control circuit which is provided within the corresponding first circuit area and outputs a control signal for performing power control on the second circuit area, and a reset signal detection circuit which is provided within the corresponding first circuit area and detects an internal standby reset signal or an external standby reset signal to control the operation of the power control circuit.

6 Claims, 3 Drawing Sheets

POWER CONTROL FOR A CORE CIRCUIT AREA OF A SEMICONDUCTOR INTEGRATED CIRCUIT DEVICE

BACKGROUND OF THE INVENTION

The present invention relates to a semiconductor integrated circuit device such as a large scale integration (hereinafter called "LSI") which performs power control to realize a reduction in power consumption.

In order to achieve a reduction in power consumption of a semiconductor integrated circuit device (e.g., LSI), a technique for bringing a power supply brought to an on (hereinafter called "ON") state at a normal operation accompanied with the need for its operation to an off (hereinafter called "OFF") state upon a waiting state (standby state) free of the demand for its operation has heretofore been described in, for example, patent documents (Japanese Unexamined Patent Publication No. Hei 5(1993)-259879 and Japanese Unexamined Patent Publication No. 2003-332901) or the like.

As described in these patent documents or the like, the LSI is not generally subjected to the demand for its operation at all times during applications and always repeats the state of the normal operation accompanied with the need for its operation and the standby state free of the demand for its operation. It is general that measures to reduce power consumption are taken in the standby state free of the need to allow the LSI to function.

As a power management method for reducing or suppressing power consumption of the LSI, attempts have heretofore been made to suppress a state transition of each transistor lying inside the LSI and thereby reduce an operating current, using a method for reducing the frequency of a clock signal for synchronization or stopping the clock signal.

However, the conventional measures to reduce power consumption are not capable of suppressing a quiescent current (leak current) peculiar to the transistor although the operating current can be reduced. With the growing speed of the LSI and an increase in the number of gates, there has recently been a tendency that a transistor having high drive capacity is frequently used. This type of transistor causes a large leak current. With its greater use, the leak current appears as a value so large as to be innegligible with respect to the total operating current of the LSI. Therefore, it is becoming hard to obtain the effect of reducing the power consumption where the operation transition of the transistor is merely suppressed.

SUMMARY OF THE INVENTION

An object of the present invention is to provide a semiconductor integrated circuit device that is capable of solving such a problem and reducing a leak current or the like by power control to thereby achieve a reduction in power consumption.

According to one aspect of the present invention, for attaining the above object, there is provided a semiconductor integrated circuit device comprising first circuit areas in which power is always held ON, a second circuit area capable of switching between ON/OFF states of the power, a power control circuit which is provided within the corresponding first circuit area and outputs a control signal for performing power control on the second circuit area, and a detection circuit which is provided within the corresponding first circuit area and detects an internal signal or a signal sent from outside to control an operation of the power control circuit.

According to the present inventions an operating current and a quiescent current in the second circuit area can both be rendered zero by turning OFF the power supplied to the second circuit area at standby, whereby a reduction in the power consumption of the semiconductor integrated circuit device can be materialized.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

An LSI has first circuit areas (e.g., an I/O area and a VBAT area) in which power is always held ON, a second circuit area (e.g., a CORE area) capable of ON/OFF-switching of the power, a power control circuit which is provided within the corresponding first circuit area and outputs a control signal for performing power control on the second circuit area, and a reset signal detection circuit which is provided within the corresponding first circuit area and detects an internal standby reset signal or an external standby reset signal to control the operation of the power control circuit.

Preferred embodiments of the present invention will hereinafter be described with reference to the accompanying drawings.

First Preferred Embodiment

Figure 1:
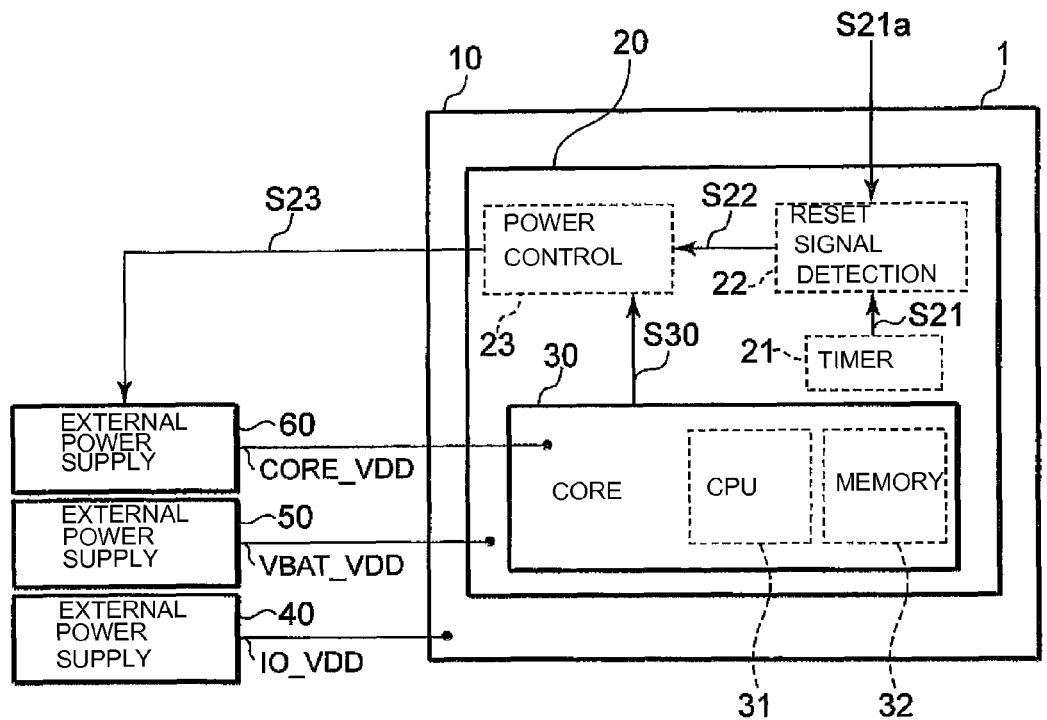
FIG. 1 is a schematic configuration diagram of an LSI showing a first embodiment of the present invention.

FIG. 1 is a schematic configuration diagram of a semiconductor integrated circuit device (e.g., LSI) showing a first embodiment of the present invention.

The LSI 1 has two first circuit areas in which power is always held in an ON state, and a second circuit area capable of switching between ON/OFF states of the power. The two first circuit areas comprise, for example, an I/O area 10 which performs the input/output (hereinafter called "I/O") of signals, and a VBAT area 20 which is provided within the I/O area 10 and operated by a battery voltage (hereinafter called "VBAT") The second circuit area comprises, for example, a core (hereinafter called "CORE") area 30 corresponding to a principal part of the LSI 1. The CORE area 30 is provided within the VBAT area 20.

Of the I/O area 10, the VBAT area 20 and the CORE area 30 corresponding to the three power areas, the I/O area 10 is an area operated by a source voltage IO_VDD supplied from an I/O external power supply 40 held ON (left turned ON at all times) at both of a normal operation and a standby state. An I/O buffer or the like for performing swapping of signals with the outside (interfacing therewith) is formed within the I/O area 10.

The VBAT area 20 is an area operated by a source voltage VBAT_VDD supplied from a VBAT external power supply 50 held ON at all times. Circuits (e.g., a timer 21, a reset signal detection circuit 22 corresponding to a detection circuit, and a power control circuit 23 and the like) constituted of transistors capable of medium-speed operation or high-speed operation are formed within the VBAT area 20.

The timer 21 is, for example, a circuit which counts up according to an unillustrated clock signal supplied from the outside of the LSI 1 and outputs an internal standby reset signal S21 corresponding to a trigger signal for standby release. The reset signal detection circuit 22 is a circuit that detects the input of an external standby reset signal S21a or internal standby reset signal S21 corresponding to the trigger signal for standby release, leading to the reset or return from the standby state, and outputs a CORE power start signal S22. The power control circuit 23 is a circuit which starts a power control operation in accordance with the CORE power start signal S22 and outputs a CORE power enable signal S23 for bringing the corresponding external power supply into an activated state (active state) to the outside, and which stops the power control operation in accordance with a CORE power stop signal S30.

The CORE area 30 is an area operated by a source voltage CORE_VDD supplied from a CORE external power supply 60 which is turned ON at the normal operation and turned OFF in the standby state. Circuits constituted of transistors and the like capable of medium-speed operation or high-speed operation, which are the same as those for the VBAT area 20, are formed within the CORE area 30. As the circuits, for example, a circuit block 32 constituted of a memory, a functional block (hereinafter called "IP") of a system LSI and the like exists in addition to a central processing unit (hereinafter called "CPU") 31 which controls the entire LSI 1 by software (program) to execute an instruction for the output of the control signals such as the CORE power stop signal S30, and the like.

The CORE external power supply 60 for operating the CORE area 30 is ON/OFF-switched in response to the CORE power enable signal S23 outputted from the power control circuit 23, that is, the CORE external power supply 60 is turned ON at the normal operation and turned OFF at standby. Since the I/O area 10 and the VBAT area 20 are always held ON although the operation of the CORE area 30 is also stopped at the time of OFF at standby, an unillustrated I/O buffer lying within the I/O area 10 is also held in an operating state at all times. Maintaining the I/O buffer in the ON state at all times in this way leads to the occurrence of noise, a malfunction and the like depending upon signals for the input/output to each circuit lying in the CORE area 30 placed under the OFF state. Thus, as its measures, the unillustrated I/O buffer provided within the I/O area 10 takes a circuit configuration in which the input/output is set to a fixed voltage when the CORE area 30 is in the standby state in which it is deactivated.

Although not shown in the drawing, there is provided such a protection circuit that a through current does not flow between the VBAT area 20 and the CORE area 30 at a signal interface between the two areas even when the power for the CORE area 30 is turned OFF.

(Operation of First Embodiment)

Figure 2:
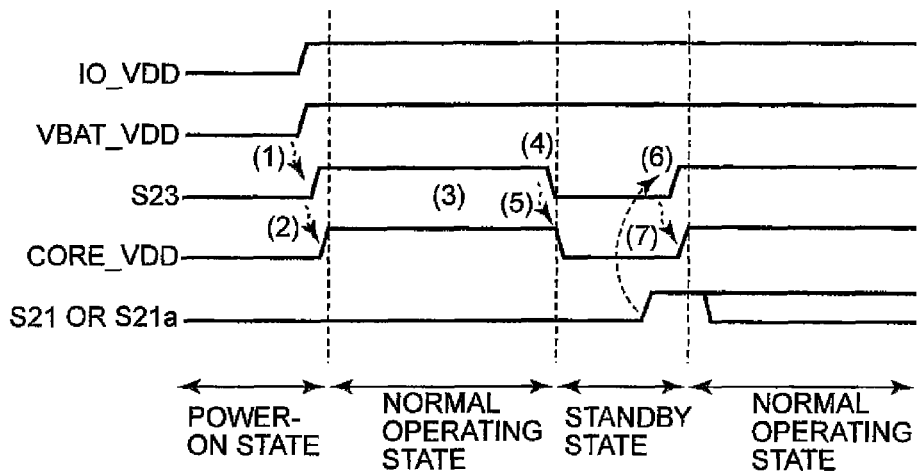
FIG. 2 is a time chart showing operation of the LSI 1 shown in FIG. 1.

FIG. 2 is a time chart showing operation of the LSI 1 shown in FIG. 1.

The LSI 1 according to the first embodiment performs the following operations (a) through (d).

(a) At Power-On

The source voltage IO_VDD of the I/O external power supply 40 and the source voltage VBAT_VDD of the VBAT external power supply 50 are supplied to the LSI 1. At this time, the source voltage CORE_VDD is not yet supplied from the CORE external power supply 60. When the VBAT external power supply 50 is turned ON so that the supply of the source voltage VBAT_VDD to the VBAT area 20 is started, the CORE power enable signal S23 outputted from the power control circuit 23 is rendered active (see FIG. 2(1)). In response to the CORE power enable signal S23 being rendered active, the CORE external power supply 60 is turned ON so that the supply of the source voltage CORE_VDD to the CORE area 30 is started (see FIG. 2(2)).

(b) Normal Operation

All the power supplies for the I/O area 10, VBAT area 20 and CORE area 30 are respectively brought to an ON state and hence the LSI is brought to a normal operating state (see FIG. 2(3)).

(c) At Standby

When a CORE power stop instruction is outputted from the CPU 31 by means of software during or in applications, the CORE power stop signal S30 is outputted from the CORE area 30 and supplied to the power control circuit 23. In response to the CORE power stop signal S30, the power control circuit 23 brings the CORE power enable signal S23 held in the active state upon the normal operation to an inactive or deactivated state (see FIG. 2(4)). In response to the CORE power enable signal S23 being rendered inactive, the CORE external power supply 60 is turned OFF so that the supply of the source voltage CORE_VDD to the CORE area 30 is stopped, whereby the LSI 1 is brought to the standby state (see FIG. 2(5)).

(d) Restoring to Normal Operation

When the external standby reset signal S21a supplied from outside or the internal standby reset signal S21 outputted from the timer 21 is inputted to the reset signal detection circuit 22 when the LSI 1 is at standby, the CORE power start signal S22 outputted from the reset signal detection circuit 22 is supplied to the power control circuit 23. In response to the CORE power start signal S22, the power control circuit 23 brings the CORE power enable signal S23 held inactive at the standby state into an active state (see FIG. 2(6)). Thus, the CORE external power supply 60 is transitioned to an ON state (see FIG. 2(7)) and hence the LSI 1 is brought to the normal operating state again.

(Advantageous Effects of First Embodiment)

According to the first embodiment, when the power supplied to the CORE area 30 is turned OFF at standby, an operating current and a quiescent current in the CORE area 30 can both be rendered zero, so that a reduction in power consumption of the LSI 1 can be realized.

Second Preferred Embodiment

Configuration of Second Embodiment

Figure 3:
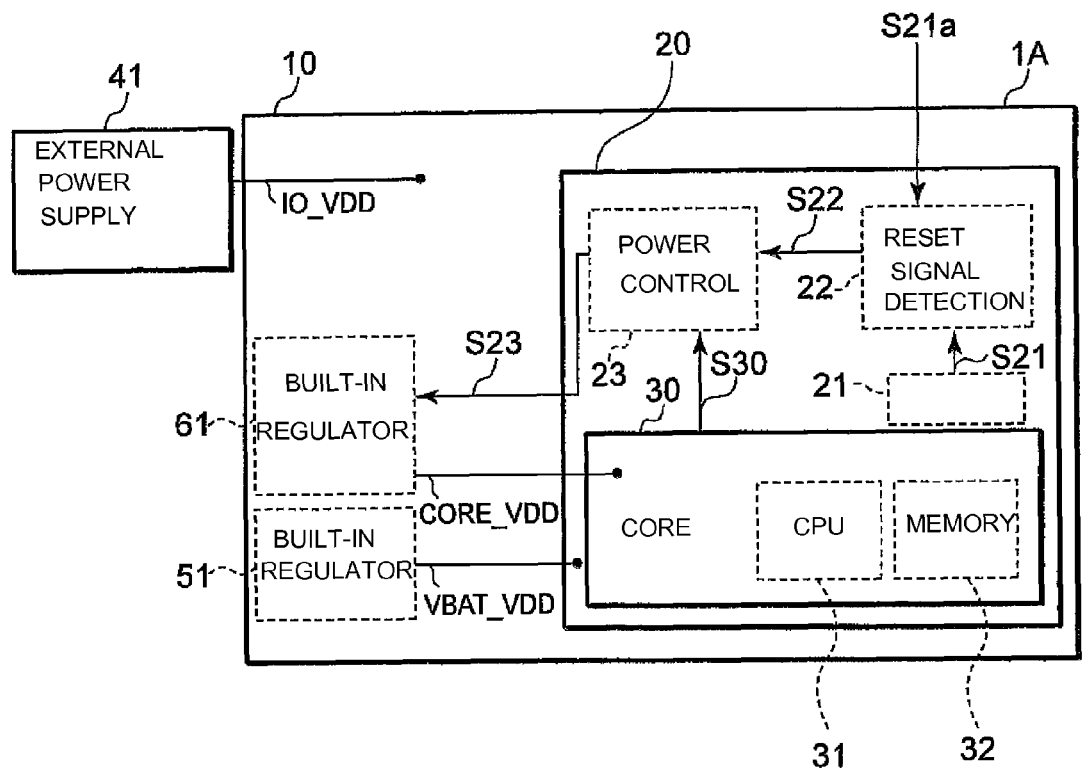
FIG. 3 is a schematic configuration diagram of an LSI illustrating a second embodiment of the present invention.

FIG. 3 is a schematic configuration diagram of a semiconductor integrated circuit device (e.g., LSI) showing a second embodiment of the present invention. Common symbols are respectively attached to elements common to those shown in FIG. 1 illustrative of the first embodiment.

In the LSI 1A of the second embodiment, an external power supply 41 for an I/O and a built-in voltage regulator, a VBAT built-in regulator 51 and a CORE built-in regulator 61 are respectively provided as an alternative to the I/O external power supply 40, VBAT external power supply 50 and CORE external power supply 60 employed in the LSI 1 of the first embodiment.

The external power supply 41 is of a power supply which is provided outside the LSI 1A and held ON at all times and which supplies a source voltage IO_VDD to an I/O area 10. The VBAT built-in regulator 51 is an internal power supply which is provided within the I/O area 10 and held ON at all times and which steps down a source voltage IO_VDD supplied form the external power supply 41 to generate or produce a source voltage VBAT_VDD and supplies the same to a VBAT area 20.

The CORE built-in regulator 61 is an internal power supply which is provided within the I/O area 10 and ON/OFF-switched in response to a CORE power enable signal S23 supplied from a power control circuit 23 lying within the VBAT area 20 so that the CORE built-in regulator 61 is turned ON at the normal operation and turned OFF at standby, and which, when the CORE built-in regulator 61 is turned ON, steps down the source voltage IO_VDD supplied from the external power supply 41 to generate a source voltage CORE_VDD and supplies the same to a CORE area 30. Other configurations are similar to those of the first embodiment.

(Operation of Second Embodiment)

Figure 4:
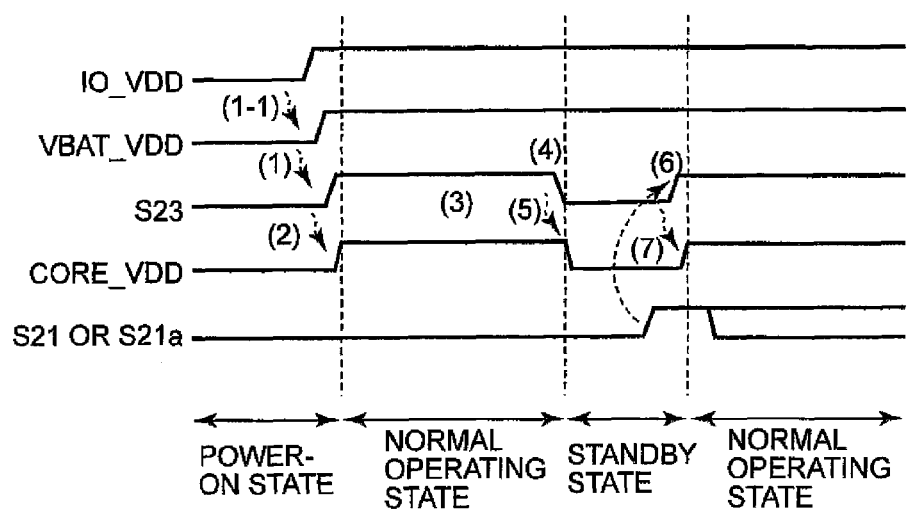
FIG. 4 is a time chart showing operation of the LSI 1A shown in FIG. 3.

FIG. 4 is a time chart showing operation of the LSI 1A shown in FIG. 3.

The LSI 1A of the second embodiment performs the following operations (a) through (d).

(a) At Power-On

The source voltage IO_VDD supplied from the external power supply 41 for the I/O and built-in regulator is supplied to the I/O area 10 of the LSI 1A. In response to the source voltage IO_VDD, the VBAT built-in regulator 51 is turned ON to supply the source voltage VBAT_VDD to the VBAT area 20 (see FIG. 4(1-1)). Thus, the power control circuit 23 provided within the VBAT area 20 is operated so that the CORE power enable signal S23 outputted therefrom is brought into an active state (see FIG. 4(1)). In response to the CORE power enable signal S23 being rendered active, the CORE built-in regulator 61 is turned ON, so that the supply of the source voltage CORE_VDD to the CORE area 30 is started (see FIG. 4(2)).

(b) Normal Operation

All the power supplies for the I/O area 10, VBAT area 20 and CORE area 30 are respectively brought to an ON state and hence the LSI 1A is brought to a normal operating state (see FIG. 4(3)).

(c) At Standby

When a CORE power stop instruction is outputted from the CPU 31 by means of software during applications, a CORE power stop signal S30 is outputted from the CORE area 30 and supplied to the power control circuit 23. In response to the CORE power stop signal S30, the power control circuit 23 brings the CORE power enable signal S23 held in the active state upon the normal operation to an inactive or deactivated state (see FIG. 4(4)). In response to the CORE power enable signal S23 being rendered inactive, the CORE built-in regulator 61 is turned OFF so that the supply of the source voltage CORE_VDD to the CORE area 30 is stopped, whereby the LSI 1A is brought to a standby state (see FIG. 4(5)).

(d) Restoring to Normal Operation

When an external standby reset signal S21a supplied from outside or an internal standby reset signal S21 outputted from a timer 21 is inputted to a reset signal detection circuit 22 when the LSI 1A is in the standby state, a CORE power start signal S22 outputted from the reset signal detection circuit 22 is supplied to the power control circuit 23. In response to the CORE power start signal S22, the power control circuit 23 brings the CORE power enable signal S23 held inactive at the standby state into an active state (see FIG. 4(6)). Thus, the CORE built-in regulator 61 is turned ON so that the CORE area 30 is brought to an ON state (see FIG. 4(7)), thereby bringing the LSI 1A to the normal operating state again.

(Advantageous Effects of Second Embodiment)

According to the second embodiment, when the power supplied to the CORE area 30 is turned OFF at standby in a manner similar to the first embodiment, an operating current and a quiescent current in the CORE area 30 can both be rendered zero, so that a reduction in power consumption of the LSI 1A can be realized. Further, even though the power supplies to the VBAT area 20 and the CORE area 30 are substituted with the built-in regulators 51 and 61, an advantageous effect similar to the first embodiment can be obtained. Further, since no external power supplies are required, the number of parts at the entire system including the LSI 1A can be reduced and hence a reduction in system can also be realized.

Third Preferred Embodiment

Figure 5:
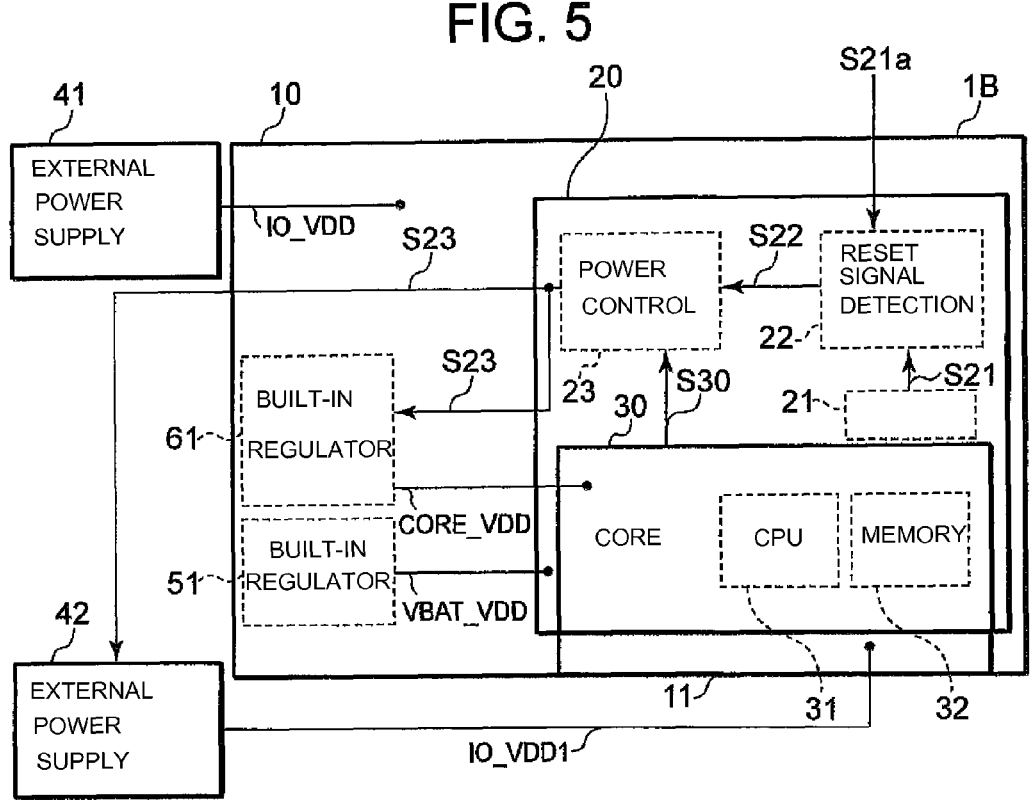
FIG. 5 is a schematic configuration diagram of an LSI depicting a third embodiment of the present invention.

FIG. 5 is a schematic configuration diagram of a semiconductor integrated circuit device (e.g., LSI) showing a third embodiment of the present invention. Common symbols are respectively attached to elements common to those shown in FIG. 3 illustrative of the second embodiment.

In the LSI 1B of the third embodiment, an I/O area 11 different from the I/O area 10 is newly provided with respect to the LSI 1A of the second embodiment. An I/O external power supply 42 for supplying a source voltage IO_VDD1 to the I/O area 11 is newly added thereto. Further, the LSI 1B has such a configuration that a CORE power enable signal S23 generated by a power control circuit 23 lying in a VBAT area 20 is outputted to the inside and outputted even to the outside.

The I/O area 11 does not take such a circuit configuration that the VBAT area 20 is interposed between the I/O area 10 and the CORE area 30. The I/O area 11 and the CORE area 30 are configured so as to directly interface to each other. With its configuration, the I/O external power supply 42 for supplying the source voltage IO_VDD1 to the I/O area 11 is ON/OFF-controlled by the CORE power enable signal S23 outputted to the outside from the power control circuit 23, so that the I/O external power supply 42 is turned ON upon the normal operation and turned OFF in conjunction with power OFF of the CORE area 30 at standby. An unillustrated I/O buffer provided in the I/O area 11 is not provided as such a circuit configuration as described in the first embodiment, wherein the input/output is set to the fixed voltage when the CORE area 30 is in the standby state in which it is deactivated. Other configurations are similar to those of the second embodiment.

(Operation of Third Embodiment)

Figure 6:
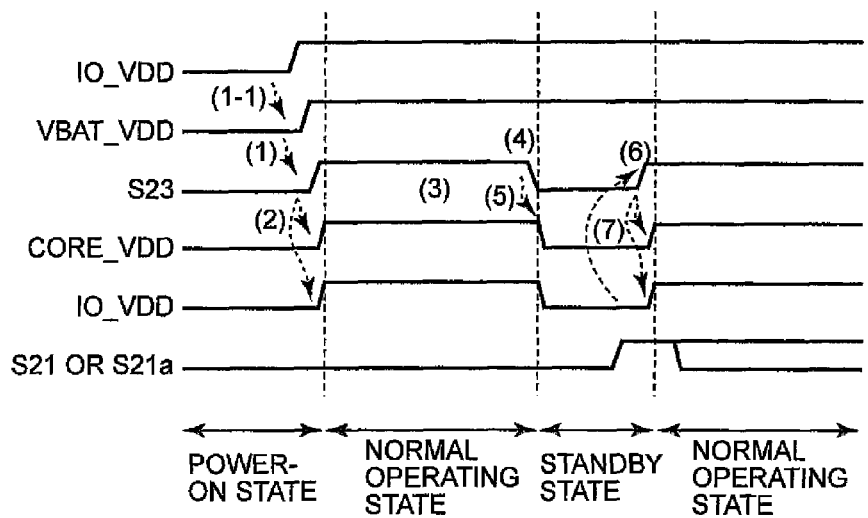
FIG. 6 is a time chart showing operation of the LSI 1B shown in FIG. 5.

FIG. 6 is a time chart showing operation of the LSI 1B shown in FIG. 5.

The LSI 1B of the third embodiment performs the following operations (a) through (d).

(a) At Power-On

A source voltage IO_VDD outputted from an external power supply 41 for an I/O and a built-in regulator is supplied to the I/O area 10 in the LSI 1B. In response to the source voltage IO_VDD, a VBAT built-in regulator 51 is turned ON to supply a source voltage VBAT_VDD to the VBAT area 20 (see FIG. 6(1-1)). When the supply of the power to the VBAT area 20 is started, the power control circuit 23 is turned ON so that the CORE power enable signal S23 is brought to an active state (see FIG. 6(1)). In response to the CORE power enable signal S23 being rendered active, a CORE built-in regulator 61 and the I/O external power supply 42 are turned ON, so that both the supply of the source voltages CORE_VDD and IO_VDD1 to the CORE area 30 and the I/O area 11 are respectively started (see FIG. 6(2)).

(b) Normal Operation

All the power supplies for the I/O area 10, VBAT area 20, CORE area 30 and I/O area 11 are respectively brought to an ON state, so that the LSI 1B is brought to a normal operating state (see FIG. 6(3)).

(c) At Standby

When a CORE power stop instruction is outputted from a CPU 31 by means of software in applications, a CORE power stop signal S30 is outputted from the CORE area 30 and supplied to the power control circuit 23. In response to the CORE power stop signal S30, the power control circuit 23 brings the CORE power enable signal S23 held in the active state upon the normal operation to an inactive or deactivated state (see FIG. 6(4)). In response to the CORE power enable signal S23 being rendered inactive, the CORE built-in regulator 61 and the I/O external power supply 42 are turned OFF so that both supply of the source voltages CORE_VDD and IO_VDD1 to the CORE area 30 and the I/O area 11 are respectively stopped, whereby the LSI 1B is brought to a standby state (see FIG. 6(5)).

(d) Restoring to Normal Operation

When an external standby reset signal S21a supplied from outside or an internal standby reset signal S21 outputted from a timer 21 is inputted to a reset signal detection circuit 22 when the LSI 1B is in the standby state, a CORE power start signal S22 outputted from the reset signal detection circuit 22 is supplied to the power control circuit 23. In response to the CORE power start signal S22, the power control circuit 23 brings the CORE power enable signal S23 held inactive at the standby state into an active state (see FIG. 6(6)). Thus, the power supply for each of the CORE area 30 and the I/O area 11 is brought to an ON state (see FIG. 6(7)), thereby bringing the LSI 1B to the normal operating state again.

(Advantageous Effects of Third Embodiment)

According to the third embodiment, when the power supplied to the CORE area 30 is turned OFF at standby in a manner similar to the second embodiment, an operating current and a quiescent current in the CORE area 30 can both be rendered zero, so that a reduction in power consumption of the LSI 1B can be realized. Further, there are provided terminals at which the application of power to the I/O area 10 is always required, due to the input of the external standby reset signal S21a and the input of a clock signal for counting up the timer 21 for the generation of the internal standby reset signal. Since, however, a terminal other than the above complies with such specs that the power can be turned OFF by providing the terminal in the I/O area 11, a further reduction in current consumption in the I/O area 11 can be done as compared with the second embodiment.

MODIFICATIONS

The present invention is not limited to the above first through third embodiments. Various use forms and modifications can be made thereto as in a case in which the LSI 1, LSI 1A and LSI 1B are set to other circuit configurations other than those illustrated in the figures.

What is claimed is:

1. A semiconductor integrated circuit device operable in a normal operating state and a standby operating state, comprising:
    an input/output (I/O) circuit area in which power is maintained in a power ON state during the normal operating state and the standby operating state;
    a battery voltage (VBAT) circuit area which is maintained in the power ON state during the normal operating state and the standby operating state;
    a core circuit area located in the VBAT circuit area;
    a power control circuit, located in the VBAT circuit area, which outputs a control signal for maintaining the core circuit area in the power ON state during the normal operating state and for maintaining the core circuit in a power OFF state during the standby operating state;
    a detection circuit, which is located in the VBAT circuit area, which detects at least one of an internal signal and an external signal, and which controls the power control circuit in response to detection of the at least one of the internal signal and the external signal; and
    a power source device located within the input/output circuit area, wherein the power control circuit outputs the control signal to the power source device which executes internal control of the power ON and OFF states of the core circuit area.

2. A semiconductor integrated circuit device operable in a normal operating state and a standby operating state, comprising:
    an input/output (I/O) circuit area in which power is maintained in a power ON state during the normal operating state and the standby operating state;
    a battery voltage (VBAT) circuit area which is maintained in the power ON state during the normal operating state and the standby operating state;
    a core circuit area located in the VBAT circuit area;
    a power control circuit, located in the VBAT circuit area, which outputs a control signal for maintaining the core circuit area in the power ON state during the normal operating state and for maintaining the core circuit in a power OFF state during the standby operating state;
    a detection circuit, which is located in the VBAT circuit area, which detects at least one of an internal signal and an external signal, and which controls the power control circuit in response to detection of the at least one of the internal signal and the external signal; and
    a power source device located within the input/output circuit area, wherein the power control circuit outputs the control signal to an external device which executes external control of the power ON and OFF states of the core circuit area, and outputs the control signal to the power source device which executes internal control of the power ON and OFF states of the core circuit area.

3. The semiconductor integrated circuit device according to any one of claims 1 and 2, wherein the internal signal is an internally generated standby reset signal and the external signal is an externally received standby reset signal.

4. The semiconductor integrated circuit device of claim 3, further comprising a timer circuit, located in the VBAT circuit area, which generates the internal standby reset signal.

5. A semiconductor integrated circuit device operable in a normal operating state and a standby operating state, comprising:
    an input/output (I/O) circuit area in which power is maintained in a power ON state during the normal operating state and the standby operating state;

a battery voltage (VBAT) circuit area which is maintained in the power ON state during the normal operating state and the standby operating state;

a core circuit area located in the VBAT circuit area;

a power control circuit, located in the VBAT circuit area, which outputs a control signal for maintaining the core circuit area in the power ON state during the normal operating state and for maintaining the core circuit in a power OFF state during the standby operating state;

a detection circuit, which is located in the VBAT circuit area, which detects at least one of an internal signal and an external signal, and which controls the power control circuit in response to detection of the at least one of the internal signal and the external signal;

a first power supply located in the I/O circuit area and supplying power to the VBAT circuit area; and a second power supply located in the I/O circuit area and selectively supplying power to the core circuit area in response to the control signal generated by the power control circuit.

6. The semiconductor integrated circuit device of claim 5, wherein the I/O circuit area is connected to a third power supply which is external the semiconductor integrated circuit device.

* * * * *